April 11, 1961 R. B. NAWMAN ET AL 2,978,831

RACK FOR TELEPHONE DIRECTORIES

Filed Dec. 11, 1957 3 Sheets-Sheet 1

INVENTORS
Rollie B. Nawman
Robert L. Nawman

BY Fisher and Swain

INVENTORS
Rollie B. Nawman
Robert L. Nawman
BY Fleher and Swain

INVENTORS
Rollie B. Nawman
Robert L. Nawman
BY Fisher and Swain

United States Patent Office 2,978,831
Patented Apr. 11, 1961

2,978,831

RACK FOR TELEPHONE DIRECTORIES

Rollie B. Nawman, Oakland, and Robert L. Nawman, Orinda, Calif., assignors to Benner-Nawman, Inc., Oakland, Calif., a corporation of California Filed Dec. 11, 1957, Ser. No. 702,102

2 Claims. (Cl. 45—85)

This invention relates generally to racks for telephone directories and more particularly to racks of this type which can be utilized in telephone booths.

Directory hangers and the like which have been used in the past have been objectionable because they have been difficult to use and often cause damage to the telephone directories. The telephone directories are generally merely hung from a chain in the telephone booth. When the telephone directories are mounted in this manner, they are particularly difficult to handle since there is no means provided for supporting the directory while it is in use.

In general, it is an object of the present invention to provide a rack for telephone directories which will permit easy use of the directory or directories.

Another object of the invention is to provide a rack of the above character which when not in use will automatically be moved to an out-of-the-way position.

Another object of the invention is to provide a rack of the above character which may be readily moved from the normal out-of-the-way position to an in-use position.

Another object of the invention is to provide a rack of the above character in which the telephone directory carried by the rack may be readily used and read while using the telephone.

Another object of the invention is to provide a rack of the above character in which one or more directories may be accommodated.

Another object of the invention is to provide a rack of the above character which may be readily mounted in a conventional telephone booth.

Another object of the invention is to provide a rack of the above character in which one of the supporting brackets forming a part of the rack also serves as a shelf for use with the telephone.

Additional objects and features of the invention will appear from the following description in which the preferred embodiments have been set forth in detail in conjunction with the accompanying drawing.

Referring to the drawing.

Figure 1:
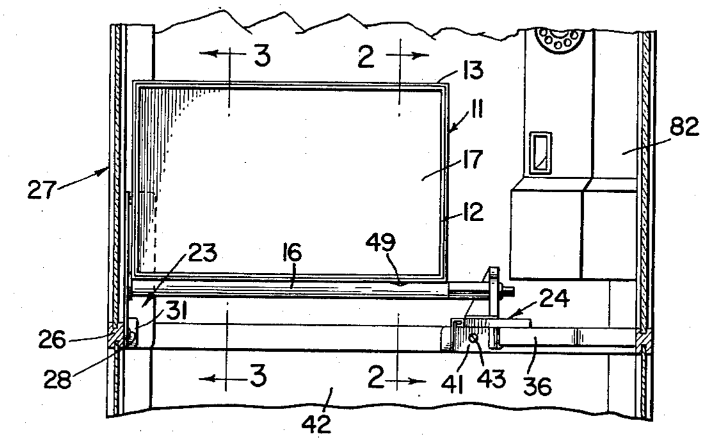
Figure 1 is a front elevational view of a rack for telephone directories embodying my invention mounted in a conventional telephone booth and shown in an out-of-the-way position.
Figure 2:
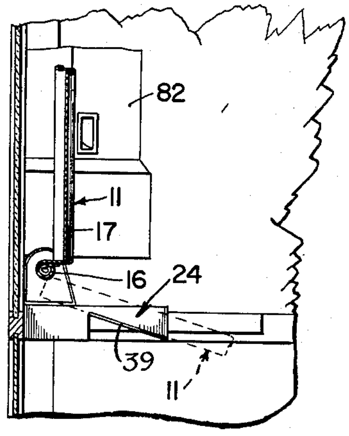
Figure 2 is a cross-sectional view taken along the line 2—2 of Figure 1.
Figure 3:
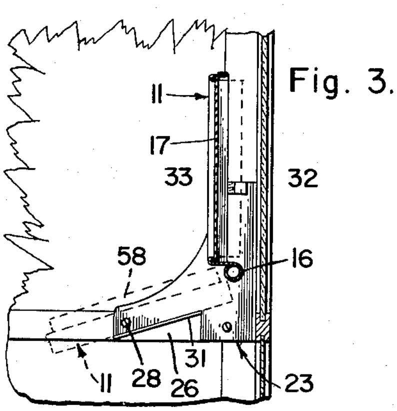
Figure 3 is a cross-sectional view taken along the line 3—3 of Figure 1.
Figure 4:
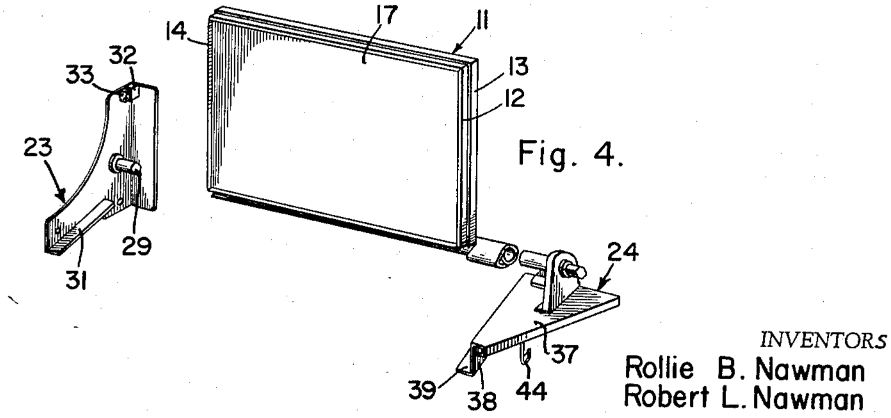
Figure 4 is an exploded perspective view of the rack shown in Figures 1, 2 and 3.

In general, the rack for telephone directories consists of a tray to which the telephone directory can be secured. Mounting means is provided for mounting the tray to permit swinging movement of the tray. Means is provided to yieldably urge the tray together with the directory attached thereto automatically from a substantially horizontal in-use position to a normal substantially out-of-the-way position. Means is also provided for limiting movement of the tray to movement between the two named positions.

The rack for telephone directories shown in Figures 1 through 8 of the drawing consists of a tray or rack 11 which is formed of suitable material such as sheet metal as shown. The tray consists of an outer framework 12 which has a downwardly and outwardly turned edge 13 on its front and side sections and an inwardly and upwardly turned bottom edge 14 on all sections. The rear section of the framework is bent to provide a tubular portion 16 extending parallel to the plane of the tray. The bottom wall 17 of the tray is mounted within the framework 12 and is supported by the upturned bottom edge 14. It is of a size that it cannot be readily removed from the framework 12. It will be noted that the upper edges of the framework 12 extend for a substantial distance above the bottom wall 17.

The tray 11 is adapted to receive one or more telephone directories and preferably at least two. Means is provided within the tray for retaining the directories in the tray. Each directory is held in place by a rod-like member 19 which is adapted to be placed in the directory when the directory is opened and then snapped into the catches 21 to firmly secure the directory to the tray in a manner well known to those skilled in the art.

Means is provided for mounting the tray to permit swinging movement of the tray between two positions as hereinafter set forth. Such means consists of a pair of brackets 23 and 24. Bracket 23 is formed of suitable material such as sheet metal and is adapted to be secured to the side wall 26 of a conventional telephone booth 27 by suitable means such as screws 28. The bracket is provided with a pintle 29 which is fixed to the bracket and which is adapted to extend into one end of the tubular portion 16 provided on the tray 11 to form a pivotal mounting for the tray. The bracket 23 has been formed to provide an inclined stop 31 which serves to limit the downward movement of the tray 11 as hereinafter described. A holder 32 is mounted on the upper end of the bracket 23 and carries a block 33 of suitable resilient material. The block 33 serves as a stop for the tray when it moves towards an out-of-the-way position as hereinafter described.

Bracket 24 is particularly designed so that it can be mounted on the shelf 36 of a conventional telephone booth. The bracket 24 is formed of a suitable material such as sheet metal and is formed with a portion 37 which is adapted to rest on the shelf 36. It is also formed with another portion 38 which extends at right angles to portion 37 and is adapted to engage one of the side edges of the shelf 36. It is also provided with another portion 39 which extends at right angles to portion 38 and is inclined in the same direction as portion 31 on bracket 33. Portion 39 serves as a stop as does the stop 31 to limit the downward movement of the tray 11. The bracket is also provided with a rear portion 41 which extends at right angles to the portion 37 and is adapted to be secured to the rear wall 42 of the telephone booth by suitable means such as screws 43. A clamp 44 is mounted on the portion 37 and is adapted to engage the shelf 36.

Figures 5, 6, 7:
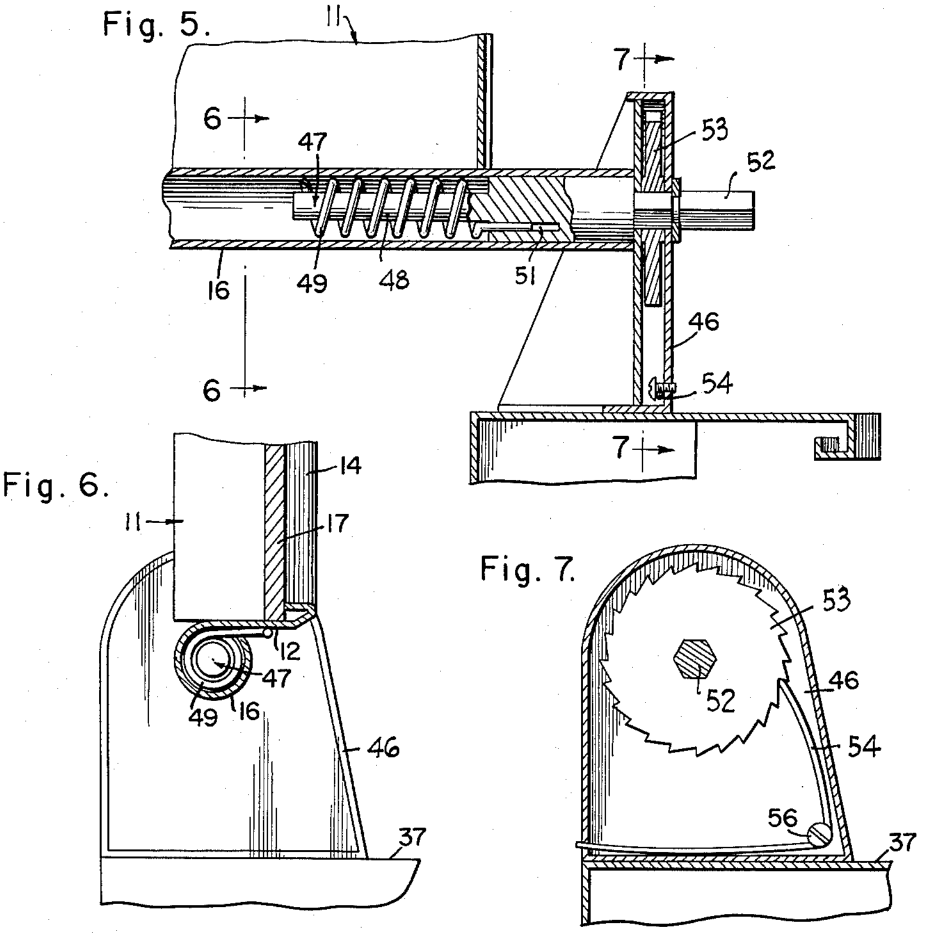
Figure 5 is an enlarged detail view in cross-section of one of the brackets for the rack.
Figure 6 is an enlarged cross-sectional view taken along the line 6—6 of Figure 5.
Figure 7 is a cross-sectional view taken along the line 7—7 of Figure 5.
Figure 8:
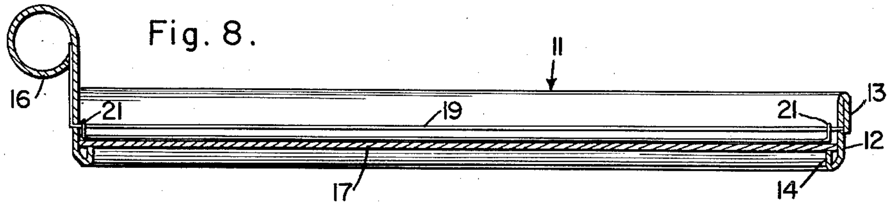
Figure 8 is an enlarged cross-sectional view of the tray.

An angle member 46 is mounted on the portion 37. The angle member carries a shaft 47 which extends into the tubular portion 16 of the tray 11 and provides a rotatable mount for the tray 11. The shaft 47 has a portion 48 of reduced diameter which carries a spring 49. One end of the spring 49 is mounted in a hole 51 (Figure 5) and the other end rests against the framework of the tray as shown in Figure 6. The shaft 47 is also provided with a hexagonal portion 52 which carries a ratchet wheel 53. The ratchet wheel is adapted to be engaged by a pawl 54 rotatably mounted at 56.

It is readily apparent that the torsion placed by the spring upon the tray 11 can be adjusted by rotating the shaft 47 by means of a wrench or suitable tool which is adapted to engage the hexagonal portion 52. The ratchet wheel 53 and pawl 54 serve to retain the spring under the desired tension. If it is desired to decrease the tension on the spring 49, it is merely necessary to release the pawl from the ratchet wheel in a manner well known to those skilled in the art.

Operation of our rack for telephone directories may now be briefly described as follows: Let it be assumed that one or more telephone directories 58 have been mounted in the tray. Let it also be assumed that the spring 49 is stressed in such a manner that the spring tends to urge the tray or the rack to an out-of-the-way position against the rear wall of the telephone booth as shown in Figure 1. When it is desired to use one or more of the telephone directories carried by the tray, it is merely necessary to pull down the tray until it engages the stops 31 and 39. The directory may then be opened to the desired place and then with one hand holding the directory, the other hand can be utilized for using the telephone 59. Thus, a person can operate the telephone and at the same time look at the telephone directory. As soon as the person has finished using the telephone directory, the tray can be released and the spring 49 will return the tray together with the directory to the out-of-the-way position as shown in Figure 1. The resilient stop 33 serves to bring the tray to a quiet stop so that it will not bang the rear wall of the telephone booth to cause objectionable noises.

Figure 9:
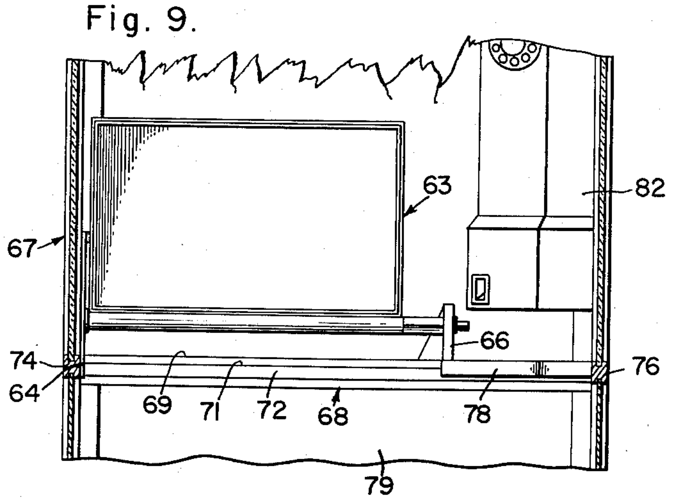
Figure 9 is a front elevational view incorporating another embodiment of my invention and showing the tray in an out-of-the-way position.
Figure 10:
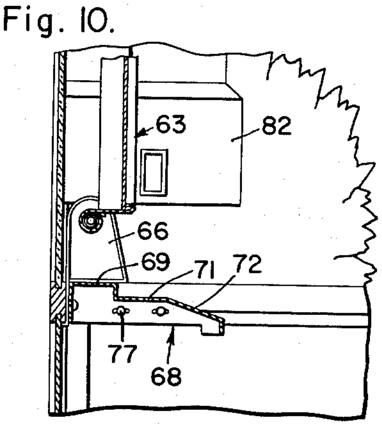
Figure 10 is a cross-sectional view taken along the line 10—10 of Figure 9.
Figure 11:
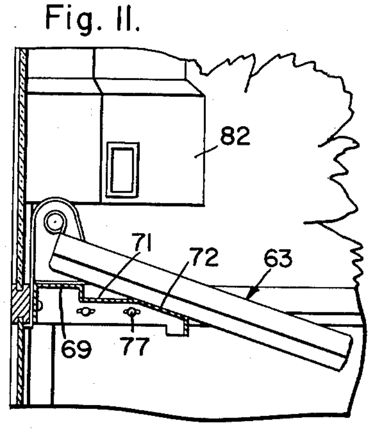
Figure 11 is a view similar to Figure 10 but showing the tray or rack in an in-use position.
Figure 12:
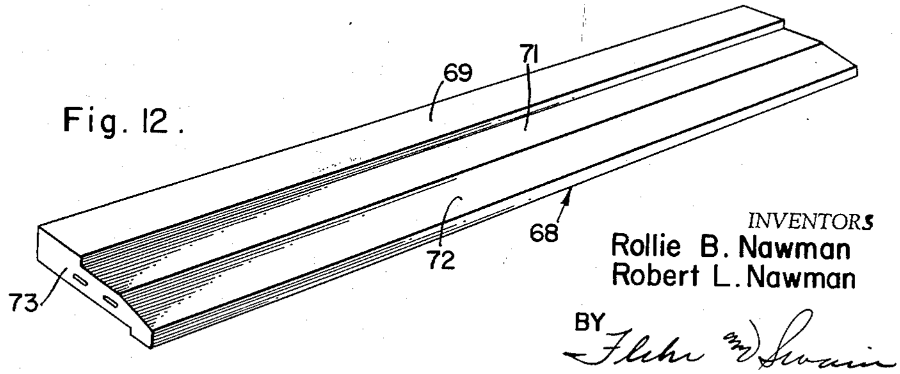
Figure 12 is an enlarged perspective view of one of the shelves incorporated in the embodiment of the invention in Figures 9, 10 and 11.

Another embodiment of our invention is shown in Figures 9, 10 and 11 and is particularly adapted to be mounted in telephone booths of the type in which the conventional shelves have not been put in place or have been removed. The tray 63 is substantially identical to the tray 11 hereinbefore described and hence will not be described in detail. The tray is carried by a pair of brackets 64 and 66 which are mounted in the telephone booth 67 as hereinafter described.

The tray is mounted above a shelf 68 which extends across the width of the booth in the rear of the booth. The shelf 68 is formed of suitable material such as sheet metal and is provided with step-like portions 69 and 71 and an inclined step-like portion 72. The shelf is also provided with side wall portions 73 which are adapted to be fixed to the side walls 74 and 76 of the telephone booth by suitable means such as screws 77. A second shelf 78 is mounted on top of the shelf 68 adjacent the right hand side of the shelf 68 as viewed in Figure 9 and extends outwardly beyond the rear wall 79 of the telephone booth and generally underlies the telephone. The shelf 78 is formed of suitable material such as sheet metal and has the bracket 66 formed as an integral part thereof. The shelf 68 is fixed relative to the shelf 78 which is fastened to the side wall 76 by screws (not shown).

The brackets 64 and 66 are substantially identical to bracket 23 and, therefore, will not be described in detail. The pintles carried by the brackets have been moved outwardly with respect to the rear wall of the telephone booth so that thicker telephone directories can be accommodated by the tray so that the tray will be permitted to move to a substantially vertical position when it is in an out-of-the-way position.

The operation of the rack shown in Figures 9, 10, 11 and 12 is similar to that hereinbefore described for the previous embodiment. The inclined portion 72 of the shelf 68 serves as a rest for the tray when it is in an in-use position.

The shelves 68 and 78 provide a wide shelf area which often is of use in a telephone booth. The shelf 78 extends substantially beyond the telephone 82 within the telephone booth and, therefore, can be utilized for taking notes, holding change and the like. The particular shelf arrangement also adds to the attractiveness of the telephone booth.

It is apparent from the foregoing that we have provided a new and improved rack for telephone directories which is particularly advantageous in that it permits ready access and use of telephone directores. When the telephone directories are not in use, the directories are automatically moved to an out-of-the-way position. The rack is designed in such a manner that it takes very little space within the telephone booth.

We claim:

1. In a rack for telephone directories of the type adapted for use in a telephone booth, a tray having a substantially flat upper surface, means for securing one or more telephone directories on said trays on said upper surface to permit opening and use of said telephone directories when said tray is in a substantially horizontal in-use position, means adapted to be secured to the telephone booth and for mounting said tray to permit swinging movement of said tray about a horizontal axis, said means serving to mount the tray in such a manner that the axis of movement of the tray is adapted to be parallel to and adjacent one of the walls of the telephone booth, means yieldably lifting said tray together with the directories attached thereto from a substantially horizontal in-use position to maintain said tray and directories in a normal substantially vertical out-of-the-way position whereby the telephone directories are adapted to be held in engagement with the wall of the telephone booth adjacent which the tray is mounted, and means for limiting movement of said tray between said out-of-the-way and in-use positions, said means for mounting said tray to permit swinging movement thereof consisting of a pair of end brackets adapted to be fixed to the telephone booth, each of the brackets carrying members which rotatably mount the tray, and an additional shelf mounted on said first named shelf, one of said brackets being a part of said shelf.

2. In a rack for telephone directories, a tray having a substantially flat upper surface, means adapted to secure one or more telephone directories to said tray on said flat upper surface to permit opening and use of the telephone directories, means mounting said tray to permit swinging movement thereof on a horizontal axis, a spring mounted on said tray and having one end engaging said tray, a shaft mounted on one end of said tray and engaging the other end of said spring, a ratchet wheel affixed to said shaft, a pawl engaging said ratchet wheel, said spring being adjustable by rotation of said shaft to lift said tray together with the directories attached thereto from a substantially horizontal in-use position to a substantially vertical out-of-the-way position, said spring means permitting said tray and directories attached thereto to be pulled down from the out-of-the-way position to the in-use positions, said means mounting said tray to permit swinging movement thereof including a pair of end brackets, one of said brackets serving to enclose said ratchet wheel and said pawl, and means for limiting movement of said tray between out-of-the-way and in-use positions.

References Cited in the file of this patent

UNITED STATES PATENTS

| | | |
|---|---|---|
| 328,968 | Pearsall | Oct. 27, 1885 |
| 633,432 | Dodd | Sept. 19, 1899 |
| 639,826 | Richardson | Dec. 26, 1899 |
| 745,978 | Markam et al. | Dec. 1, 1903 |
| 991,616 | Hazard | May 9, 1911 |
| 1,017,121 | Walsh | Feb. 13, 1912 |
| 1,454,197 | Walsh | May 8, 1923 |
| 2,528,318 | Payne | Oct. 31, 1950 |
| 2,574,250 | Dalton | Nov. 6, 1951 |

FOREIGN PATENTS

| | | |
|---|---|---|
| 776,928 | French | Nov. 17, 1934 |